US008509939B2

(12) United States Patent
Bubash et al.

(10) Patent No.: US 8,509,939 B2
(45) Date of Patent: Aug. 13, 2013

(54) METHOD OF CREATING A UNIQUE PATTERN FOR EMBROIDERY OR PRINTING ON ARTICLES OF CLOTHING AND PRINTING ON OTHER OBJECTS

(76) Inventors: James E. Bubash, St. Louis, MO (US); Gerald McCabe, St. Louis, MO (US)

( * ) Notice: Subject to any disclaimer, the term of this patent is extended or adjusted under 35 U.S.C. 154(b) by 273 days.

(21) Appl. No.: 12/952,750

(22) Filed: Nov. 23, 2010

(65) Prior Publication Data

US 2011/0125309 A1 May 26, 2011

Related U.S. Application Data

(60) Provisional application No. 61/264,020, filed on Nov. 24, 2009.

(51) Int. Cl.
*G06F 19/00* (2011.01)

(52) U.S. Cl.
USPC ............................ 700/132; 700/130; 700/131

(58) Field of Classification Search
USPC ................................. 700/130–133; 273/272
See application file for complete search history.

(56) References Cited

U.S. PATENT DOCUMENTS

| | | | | |
|---|---|---|---|---|
| 5,667,438 | A * | 9/1997 | Rehm | 463/9 |
| 7,103,916 | B1 * | 9/2006 | Goodew et al. | 2/49.1 |
| 7,210,996 | B2 * | 5/2007 | Rehm et al | 463/9 |
| 2003/0229931 | A1 * | 12/2003 | Smedi | 2/159 |
| 2004/0162126 | A1 * | 8/2004 | Rehm et al. | 463/9 |
| 2005/0125877 | A1 * | 6/2005 | Benjamin et al. | 2/158 |

* cited by examiner

*Primary Examiner* — Nathan Durham
(74) *Attorney, Agent, or Firm* — Polster, Lieder, Woodruff & Lucchesi, L.C.

(57) ABSTRACT

A method of creating a pattern incorporating words in a unique format. Information including selected words, numbers, and symbols are entered into a computer program. The computer program arranging the information into a matrix format in which each word is interconnected with at least one other word by a letter common to each word. The resulting matrix is then as a template for reproducing the matrix on garments and other physical objects. The words entered into the computer program are arranged in a hierarchy with different words occupying different levels within the hierarchy, with a user of the method designating a different color for each level within the hierarchy and the words in the resulting matrix being displayed in the selected colors.

9 Claims, 2 Drawing Sheets

METHOD OF CREATING A UNIQUE PATTERN FOR EMBROIDERY OR PRINTING ON ARTICLES OF CLOTHING AND PRINTING ON OTHER OBJECTS

CROSS-REFERENCE TO RELATED APPLICATIONS

The present application is related to and claims priority from, U.S. provisional patent application 61/264,020 filed Nov. 24, 2009, which is incorporated herein by reference.

BACKGROUND OF THE INVENTION

This invention relates to the creation of designs or patterns for embroidery or printing on articles of clothing as well as printing on objects such as cups and the like; and more particularly, to the creation of a pattern based upon family names or other specifically selected words, numbers, or symbols or a combination of them which are then arranged in a matrix format with the resulting arrangement being used for the embroidery or printing.

CROSS-REFERENCE TO RELATED APPLICATIONS

The present application is related to and claims priority from, U.S. provisional patent application 61/097,040 filed Sep. 15, 2008, which is incorporated herein by reference.

For events such as family reunions, corporate events, or other business or social happenings, it is sometimes desirable to create a memento of the event to remind participants at the event of the special nature of it. In this regard, for family reunions, for example, t-shirts or other items of apparel have been imprinted with a legend such as "The Smith family reunion, Jul. 15, 2009", and then given out to be worn by those attending the event.

The present invention is directed to method of creating mementos for such events using the names of the participants or other indicia important to the sponsor of the event and to do so in such a way as to provide a unique memento of the event or occasion.

BRIEF SUMMARY OF THE INVENTION

The present invention is for a method of taking the names of people, other words important to a sponsor of an event, as well numbers and symbols, and to form them into a matrix incorporating all of the names, words, numbers, or symbols. The information is provided as an input to a computer program which creates a matrix incorporating all of the entered information. The resulting matrix is then used as a template for embroidery or printing onto an article of clothing (t-shirt, sweatshirt, hoodie, etc.) or for printing onto an article such as a cup, plate, placard, etc.

Names, words, numbers, and symbols are provided as inputs into a computer program which creates the matrix. With respect to people names and/or words, they are combined in the matrix so a letter common to more than one name or word is used to interconnect it with another name or word. After the matrix is created, the sponsor can accept it or reject it. If rejected, a new matrix is created using the information previously provided. Once an acceptable matrix is produced, it is provided to embroidery or printing equipment to reproduce the matrix on a selected piece of clothing, or on a selected article.

The matrix includes the selection of various colors which are used in combination, and the sponsor can select certain colors for certain names or words and other colors for other names or words so to create a hierarchy within the pattern created using the method. In addition to colors, the matrix allows the user to have the names or words in different fonts and font sizes, as well as being underlined, italicized, or in bold face.

BRIEF DESCRIPTION OF THE SEVERAL VIEWS OF DRAWINGS

The objects of the invention are achieved as set forth in the illustrative embodiments shown in the drawings which form a part of the specification.

Corresponding reference characters indicate corresponding parts throughout the several views of the drawings.

DETAILED DESCRIPTION OF INVENTION

Figure 1:
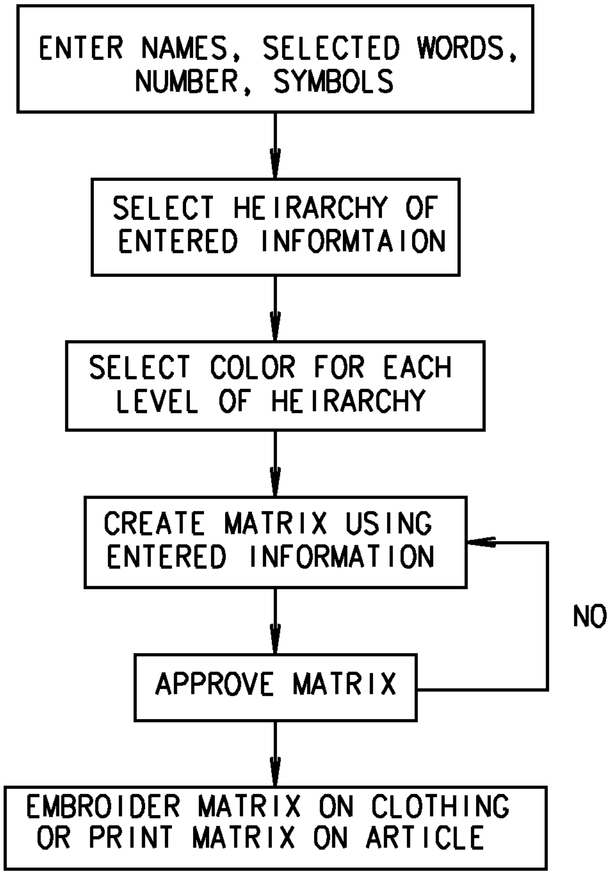
FIG. 1 is a flow chart illustrating the method of the invention.

Referring to the drawings, a method is disclosed for creating a unique pattern of words including proper names of people, numbers, and symbols which, once created, is used for embroidery on clothing or for printing on clothing or other objects and articles. In accordance with the invention, the pattern comprises letters, numbers, and symbols arranged in a matrix format. The letters most often are combined to form nouns, adjectives, and adverbs. The names include the names of people; for example, the names of parents, their children, and their grandchildren. Or, the names can include family members such as those participating in a family reunion, or people attending a corporate sponsored event. The names also can be, for example, those of a product and attributes a manufacturer associates with the product. The symbols can be preselected symbols such as a heart; or, the symbol can be custom designed. For example, the symbol can be a logo representing a particular organization or company, or a product. Regardless, the method of the invention is to take the selected information and combine it into a unique matrix format which is then placed on various types of garments, or other articles or objects.

Figure 2:
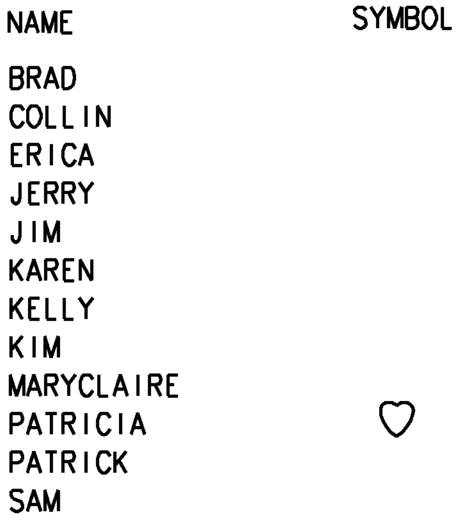
FIG. 2 is a representational listing of people's name used in forming the matrix.

In accordance with the method, and as indicated in FIG. 1, the selected names of people, selected words or numbers, and symbols, are first provided as inputs to a computer program installed on a personal computer (PC) or the like. A representative list of peoples' names is illustrated in FIG. 2, together with a selected symbol (a heart). Although the names are listed alphabetically in FIG. 2, in practice they may be entered randomly. Those skilled in the art will appreciate that there are numerous ways by which the names, words, numbers, or symbols can be entered into the program without departing from the scope of the invention. For example, they may be entered into different boxes on an entry screen with each box representing a different color.

When, or as the names are entered into the program, a hierarchy of the names is selected. For example, the names representing the parents in a family are designated as occupying a first level in the hierarchy. Then, the names representing their children are designated as occupying a second level in the hierarchy; and those of the grandchildren a third level. It will be understood by those skilled in the art that there may be more or fewer levels, or no levels at all, as to the names, words, numbers, or symbols entered into the program.

Figure 3:
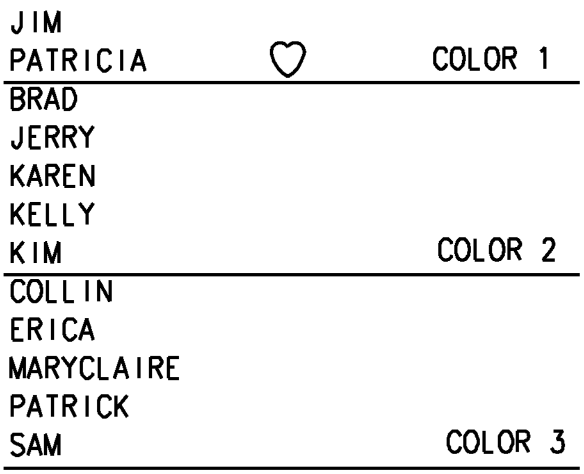
FIG. 3 is another listing with the names arranged in a hierarchy and with selected colors associated with selected names; and, FIG. 4 illustrates a matrix formed using the names.

In FIG. 3, a representative hierarchy having three levels (parents, children, grandchildren) is shown. To help identify who is who in the completed matrix, a color is chosen for each name, word, number, or symbol within a particular level. Thus, the two names in the first level will ultimately be embroidered or printed on a garment, or printed on an object or article using a first color (e.g., red). The next level is chosen to have a second color (e.g., blue), and the following level a third color (e.g., green). Additional colors are then used for subsequent levels. The particular color selected for each level is chosen by the person entering the information. If no hierarchy is chosen when the information is entered, the user has the option of selecting one color in which all the names, in this example, will be produced. Or, the user can select that the color in which the names produced be random, or from among two or more colors which are selected. Besides the use of color, the method of the invention further allows the user to select different names or words to be in different fonts or font sizes, as well as being underlined, italicized, or in bold face.

Figure 4:
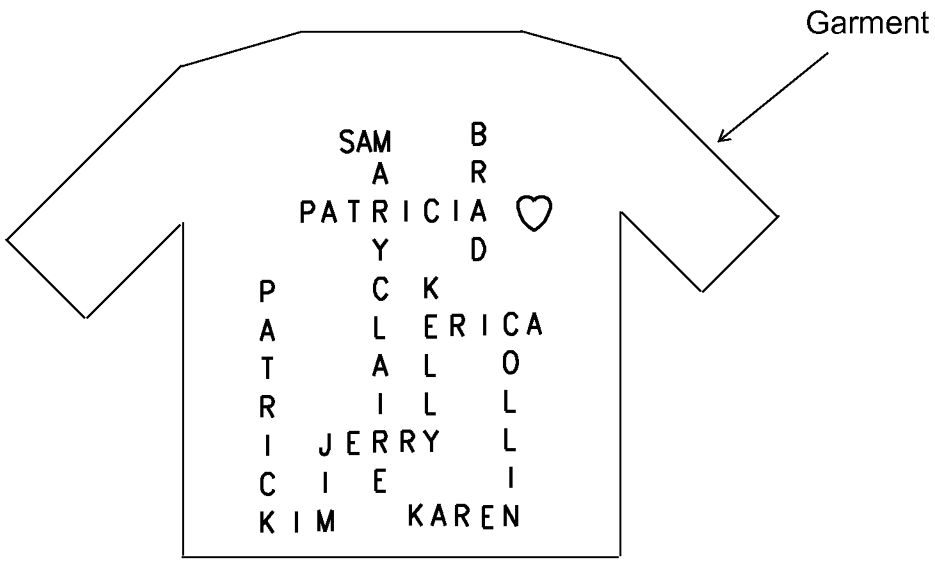

After the selections are made, the program takes the information entered and uses it to create a unique matrix design in which all of the names, and in this example, the symbol are incorporated. It is a feature of the program that the matrix interconnects substantially all, if not all, of the names entered into it as shown in FIG. 4. Although not shown in FIG. 4, it will be understood that if a name or word cannot be interconnected in the matrix with another name or word, the name or word will still be incorporated into the matrix using the method, so as to be embroidered or printed with the remainder of the contents of the matrix. In producing the matrix, the program follows a number of rules. One, as previously discussed, is that the names listed in the various levels are presented in a different color than the names listed in the other levels. Another rule is that the letter which is the interconnection between two names is printed in the color of the name in the higher level of the hierarchy. Thus, the letter N which is common to both the names COLLIN and KAREN in the matrix is printed with the color associated with KAREN, since that name is from a higher level.

Once the matrix is created, it is presented as a computer display, and provided as a color printout for review and acceptance by the user. If the user accepts the matrix, a file is created which is then used by embroidery and printing equipment to reproduce the matrix on garments of different types, and on objects (cups, plates, etc.) or other articles (calendars, posters, etc.). It will be understood by those skilled in the art that when the matrix is embroidered or printed, the outline of the cells forming the matrix may or may not be reproduced, only the contents of the cells.

If, however, the user rejects the matrix for whatever reason, the program discards that matrix and uses the information entered into it to produce a second matrix for approval by the user. The user further has the option to accept the first matrix and have the program creates additional matrices which the user can also select, thereby providing the user a wider range of artwork from which to select.

What is claimed is:

1. A method of creating a pattern incorporating words in a unique format comprising:

providing garments;

providing a client device with a computer program;

entering information including selected words, into the computer program of the client device;

arranging with the computer program the information into a matrix format in which each word is interconnected with at least one other word by a letter common to each word; and using the resulting matrix as a template for reproducing the matrix on the garments.

2. The method of claim 1 further including entering numbers and symbols into the computer program with the resulting matrix incorporating the numbers and symbols.

3. The method of claim 2 in which the words entered into the computer program are arranged in a hierarchy with different words occupying different levels within the hierarchy.

4. The method of claim 3 in which a user of the method designates a different color for each level within the hierarchy and the words in the resulting matrix are displayed in the selected colors.

5. The method of claim 3 in which the user selects different entries presented in the matrix to be in a different font from that in which other entries are presented.

6. The method of claim 3 in which the user selects different entries presented in the matrix to be in a different font size from that in which other entries are presented.

7. The method of claim 3 in which the user selects different entries presented in the matrix to be in italics.

8. The method of claim 3 in which the user selects different entries presented in the matrix to be underlined.

9. The method of claim 3 in which the user selects different entries presented in the matrix to be in boldface.

* * * * *